(12) United States Patent
Stethem (10) Patent No.: US 6,643,114 B2
(45) Date of Patent: Nov. 4, 2003

(54) PERSONAL DEFENSE DEVICE

(76) Inventor: Kenneth J. Stethem, P.O. Box 22, Rupert, VT (US) 05768

( * ) Notice: Subject to any disclaimer, the term of this patent is extended or adjusted under 35 U.S.C. 154(b) by 33 days.

(21) Appl. No.: 10/084,972

(22) Filed: Mar. 1, 2002

(65) Prior Publication Data

US 2003/0165041 A1 Sep. 4, 2003

(51) Int. Cl.$^7$ ............................................... H01T 23/00
(52) U.S. Cl. ........................... 361/232; 231/7; 463/47.3
(58) Field of Search ........................ 361/232; 463/47.3; 231/7; 42/1.08, 1.16, 84; 362/102, 109, 577, 120; D22/117; D30/156

(56) References Cited

U.S. PATENT DOCUMENTS

| | | | |
|---|---|---|---|
| 427,549 A | 5/1890 | Burton ............................ | 231/7 |
| 1,158,473 A | 11/1915 | Floyd ............................. | 231/7 |
| 2,176,994 A | 10/1939 | Hansen et al. .................. | 231/7 |
| 2,208,852 A | 7/1940 | Mongan .......................... | 231/7 |
| 2,266,606 A | * 12/1941 | Jones ......................... | 463/47.4 |
| 2,561,122 A | 7/1951 | Juergens ........................ | 231/7 |
| 3,362,711 A | 1/1968 | Larsen et al. ................ | 463/47.3 |
| 3,625,222 A | 12/1971 | Shimizu ........................ | 607/58 |
| 3,819,108 A | 6/1974 | Jordan ............................ | 231/7 |
| 4,092,695 A | 5/1978 | Henderson et al. .......... | 361/232 |
| D255,139 S | 5/1980 | Smith ............................ | D22/1 |
| 4,424,932 A | 1/1984 | Allen ........................... | 361/232 |
| D273,216 S | 3/1984 | Sinrod .......................... | D22/1 |
| 4,479,171 A | 10/1984 | Mains ......................... | 362/102 |
| 4,486,807 A | 12/1984 | Yanez ........................ | 361/232 |
| D289,313 S | 4/1987 | Shy ............................ | D22/117 |
| 4,667,431 A | 5/1987 | Mendicino ................... | 361/232 |
| 4,719,534 A | 1/1988 | Ward ........................... | 361/232 |
| 4,842,277 A | 6/1989 | LaCroix ....................... | 361/232 |
| D329,510 S | 9/1992 | Lin ............................. | D30/156 |
| D351,640 S | 10/1994 | de Anda et al. ........... | D22/117 |
| 5,467,247 A | 11/1995 | de Anda et al. ............ | 361/232 |
| 5,654,867 A | 8/1997 | Murray ........................ | 361/232 |
| 5,962,806 A | 10/1999 | Coakley et al. ............. | 361/232 |
| 5,986,872 A | 11/1999 | Chaput ........................ | 361/232 |
| 6,022,120 A | 2/2000 | Chang ......................... | 362/109 |
| 6,091,597 A | 7/2000 | Lin ............................. | 361/232 |
| 6,256,916 B1 | 7/2001 | McNulty ..................... | 42/1.08 |
| 6,293,684 B1 * | 9/2001 | Riblett ........................ | 362/184 |

FOREIGN PATENT DOCUMENTS

GB         2196728         5/1988         ........... F21V/33/00

* cited by examiner

*Primary Examiner*—Ronald W. Leja
(74) *Attorney, Agent, or Firm*—Richard C. Litman (57) ABSTRACT

A personal defense device includes an electrical stun circuit and electrodes with a structure adapted for use as an impact weapon as well, and further includes a radially disposed flashlight or signal light therewith. The electrical circuitry for the stun apparatus is formed of flexible circuit material with dual circuit paths between each component, for reliability and resistance to damage due to impact forces incurred when the device is used as an impact weapon. A second, normally closed interrupter switch is provided for the stun circuit, with the user of the present device being required to hold the interrupter switch in order to keep the stun circuitry from operating when the master switch is turned on. The end opposite the handle includes a series of impact ribs with cutting blades removably installable thereon, to produce shallow (non-life threatening) cuts in an assailant during an attack.

20 Claims, 4 Drawing Sheets

PERSONAL DEFENSE DEVICE

BACKGROUND OF THE INVENTION

1. Field of the Invention

The present invention relates generally to manual weapons such as batons, night sticks, and the like, and in addition relates to electrically powered stun devices. The present defense device combines aspects of both of the above devices, as well as other features and functions, in a single device for use by police, military, and/or others who have need of such a non-lethal weapon or device for crowd control and other purposes.

2. Description of the Related Art

The use of blunt instruments (night sticks, etc.) by police and other personnel for crowd control and for subduing other individuals, has been known for generations. Very little has been done over the years to improve such hand held impact weapons, other than changing the mass of different portions to impart greater force upon impact. More recently, electronic devices have been developed which transform a relatively low battery voltage into a considerably higher voltage, for use as an electrical stunning device. Such devices are quite effective in subduing a threatening individual, or even a small crowd, as the audible and visual impression generated by the electrical arc across the contacts, is quite intimidating.

However, such electrical stun devices are generally constructed with relatively fragile electrical components which cannot withstand a great deal of impact force. Such stun devices of the prior art are not intended for any other use, and are used solely as an electrical discharge device, with the contacts being placed against a potential attacker or other person who must be subdued. While this may result in a thrusting of the device toward the other person, the physical forces involved are nowhere near those to which a blunt impact weapon (night stick or baton, etc.) would be subjected. The relative fragility of such electrical stun weapons has thus resulted in law enforcement officers being required to carry a separate baton or night stick in addition to the electrical stun device, as well as all their other equipment (hand gun, cuffs, etc.). The mass and bulk of all this equipment can be distracting to say the least, and can certainly encumber an officer when he must move rapidly. Moreover, the requirement for two similarly shaped elongated weapons or devices (baton and electrical stun prod) can easily result in a moment's hesitation or confusion when the officer reaches for one or the other, in a situation where time is critical.

Accordingly, a need will be seen for a personal defense device which combines attributes of the baton with those of an electrical stunning device, as well as other attributes and features, in a single device. The present defense device is constructed of a relatively massive and thick walled material, in order to provide the desired mass for use as an impact weapon. Yet, the device has a hollow interior, in order to house the electrical storage cells and electrical componentry for the electrical stun system of the device. Moreover, the present device includes a series of blunt edges disposed along the barrel thereof, which provide greater effectiveness as an impact weapon. These blunt edges may be equipped with relatively shallow cutting edges to produce a bleeding cut or wound, if so desired. A flashlight or the like may, also be built into the device for greater versatility, with the light utilizing the same electrical energy source as the stun circuitry. The present defense device also makes use of redundant flex circuitry for reliability and impact damage resistance, as well as providing a novel, normally on interrupter switch for the stun circuit to facilitate use of the device by an officer.

A discussion of the related art of which the present inventor, is aware, and its differences and distinctions from the present invention, is provided below.

U.S. Pat. No. 427,549 issued on May 13, 1890 to John M. Burton, titled "Electric Prod Pole," describes two embodiments of such a device. The first embodiment of FIG. 1 is a very low voltage device, as it relies upon an "element B" (taken to be an electrical storage cell), but does not include any means of inverting the current for stepping up the voltage. The second embodiment uses a mechanical generating device, rather than a battery. In any event, the device of the Burton '549 U.S. Patent is quite long and thin, and is not adapted for use as an impact weapon in addition to its electrical prod function.

U.S. Pat. No. 1,158,473 issued on Nov. 2, 1915 to William B. Floyd, titled "Electric Animal Prod," describes a device similar to that of the Burton '549 U.S. Patent described immediately above. The Floyd prod is also a relatively long and thin device, with electrical storage batteries carried in a larger diameter handle portion. No appreciable mass is provided in the distal portion of the device, as it is desired to make the distal portion as light as possible in such devices to facilitate maneuverability. This teaches away from the present invention, with its relatively massive distal portion to provide relatively large inertial forces for use as an impact weapon, as well as providing the desired strength and durability for the device.

U.S. Pat. No. 2,176,994 issued on Oct. 24, 1939 to Lorentz A. Hansen et al., titled "Electric Stock Prod," describes a device utilizing a conventional capacitor and vibrator points for producing an alternating current from the direct current of the electrical storage batteries within the device. A coil having primary and secondary windings is used to step up the voltage to the desired level. This device is capable of producing a continuous array of high voltage discharges, unlike the devices discussed further above. While the circuitry of the Hansen et al. device is old in the art, such circuitry or its equivalents may be used in the present invention, and the disclosure of such is incorporated herein by reference. However, Hansen et al. do not disclose a relatively massive barrel portion for use as an impact weapon, nor other means (blades, etc.) for such impact function.

U.S. Pat No. 2,208,852 issued on Jul. 23, 1940 to Leon P. Mongan, titled "Electric Prodder," describes a combination device, including a voltage step-up circuit and light circuit, each powered by the same battery power source. The electrical voltage step-up circuitry is essentially the same as that used by Hansen et al. and disclosed in the '994 U.S. Patent discussed immediately above. This basic circuitry may be used with the present invention, as noted above. However, it is desired to use more durable circuitry incorporating flex circuits, redundant wiring, and solid state componentry in the present invention, rather than the older mechanical componentry of the Mongan and similar earlier devices. In any case, Mongan does not provide any means for using his device as an impact weapon, and further teaches away from the present stun device by providing an open circuit until one of the contacts is pushed in. This is not desirable in an electrical stun protective device, where the visual and audible effects of the electrical arcing are desired to provide a deterrent effect.

U.S. Pat. No. 2,561,122 issued on Jul. 17, 1951 to John Juergens, titled "Livestock Prod," describes a device having a spring mounted distal end with a selectively operable light source concentric with the annular electrical contact probes. The light and electric contacts are operated by a single, double throw switch. Thus, either the light or the electrical contacts may be actuated, but not both simultaneously. Moreover, the resiliently mounted distal end teaches away from the present rigid, massive structure which may also be used as an impact weapon.

U.S. Pat. No. 3,362,711 issued on Jan. 9, 1968 to LaVerne M. Larsen et al., titled "Night Stick With Electric Shock, Means," describes a stick having external high voltage wiring, as well as the conventional high voltage contacts extending from the distal end of the stick. The object of the Larsen et al. stick is to prevent unauthorized persons from grasping the stick and pulling it from the grip of the officer or other person controlling the stick. Larsen et al. disclose a transistorized circuit for controlling electrical power in their night stick, but no means of providing alternating current to produce a continuing series of discharges, is disclosed. The Larsen et al. night stick requires that the actuating switch be closed each time a single electrical pulse is desired, with the electrical energy dissipating as the switch remains closed and voltage stabilizes through the transformer coil.

U.S. Pat. No. 3,625,222 issued on Dec. 7, 1971 to Kunio Shimizu, titled "Baton-Type Arrest Device," describes a device having a pair of electrically conductive needles selectively extendible from one end thereof. No electrical switch is provided except by means of current flow between the two contacts. Shimizu states that by penetrating the skin, the electrical current administered may be much less to gain the desired affect than that achieved with skin contact electrodes. Accordingly, no voltage step up is provided by Shimizu. Also, while Shimizu provides an axially placed light in one end of his night stick, the light cannot be directed radially from the side of the device.

U.S. Pat. No. 3,819,108 issued on Jun. 25, 1974 to Richard J. Jordan, titled "Crowd Control Stick," describes a device bearing some resemblance to the night stick of the Larsen et al. '711 U.S. Patent, discussed further above. The Jordan stick also includes external high voltage wiring to preclude an unauthorized person from grabbing the stick and taking it from the operator. However, the Jordan stick utilizes a capacitor discharge system for producing the higher voltages desired. In any event, the Jordan stick still differs from the present device in that the power supply for the Jordan device must be provided as a separate unit and connected to the stick with a cable. Also, Jordan does not provide any form of lighting means nor impact enhancing means with his stick.

U.S. Pat. No. 4,092,695 issued on May 30, 1978 to Gary A. Henderson et al., titled "Electrical Shocking Device," describes a relatively small and light weight device including transistorized circuitry for producing a high voltage, low amperage current capable of producing an electric shock to a person contacting the electrodes. The Henderson et al. device is only about ten inches long and less than an inch in diameter, and weighs less than five ounces (col. 3, lines 41–43). Such size and weight is not suitable for use as an impact weapon, night stick, or billy club, whereas the present device provides sufficient mass and size to be useful as an impact weapon as well. Also, no lighting means is disclosed by Henderson et al., whereas the present device includes a radially disposed, selectively operable light therewith.

U.S. Pat. No. 4,424,932 issued on Jan. 10, 1984 to Gerald F. Allen, titled "Electric Shock Prod," describes a device incorporating conventional transistorized circuitry, which disclosure is incorporated herein by reference as yet another means of providing the high voltage output required for the operation of the present invention. The Allen prod differs from others in that the extension is a relatively thin and flexible blade. This construction clearly teaches away from the aim of the present invention, i.e., to serve as a night stick or impact weapon as well as being useful as an electrical stun device. Allen does not disclose any form of lighting for his prod device.

U.S. Pat. No. 4,479,171 issued on Oct. 23, 1984 to Gregg B. Mains, titled "Side Arm Baton And Flashlight," describes a relatively long, cylindrical device having battery storage space therein, a light at one end thereof, and a radially extended handle with a light switch at the end thereof. No means of producing or dispensing a high voltage electrical current or shock is provided by Mains for his light and baton combination.

U.S. Pat. No. 4,486,807 issued on Dec. 4, 1984 to Serge J. Yanez, titled "Non-Lethal Self Defense Device," describes various embodiments of an electrical stun apparatus, having different configurations. Yanez includes a light with his electrical discharge apparatus, but the light is not intended to provide any real degree of illumination for the person using the device. Rather, the Yanez light pulses or flashes with the voltage output, producing a series of flashes to temporarily blind an assailant. Accordingly, no separate switch is provided to operate the light for the Yanez device; both the light and the electrical voltage output (and an audible alarm, when installed) are all controlled by a single switch, unlike the present invention.

U.S. Pat. No. 4,667,431 issued on May 26, 1987 to Lyle J. Mendicino, titled "Shark Prod," describes an electrical device which emits a relatively low voltage (around 500 volts) and high amperage (1–5 amps), in comparison with electrical stun devices and cattle prods. This is because the diver is also subject to the electrical current, particularly in the salty ocean environment of sharks. Accordingly, Mendicino teaches away from the use of a high voltage, low amperage current as used by the present invention. Moreover, the only light provided by Mendicino is an annunciator light to indicate operation of the device, and actual actuation of the electrical circuitry is accomplished by contact with the probes, rather than by means of an operator controlled switch.

U.S. Pat. No. 4,719,534 issued on Jan. 12, 1988 to Gary S. Ward, titled "Electric Shock Safety Device," describes a stun type device having a telescoping probe end, with the probe comprising a series of mutually telescoping elements. The Ward device is more intended for use by joggers and bicyclists against threatening dogs and the like. The relatively thin and extended telescoped probe cannot provide the required strength for use as an impact weapon (night stick or the like), as provided by the present multipurpose device. Moreover, Ward does not provide any form of lighting with his device.

U.S. Pat. No. 4,842,277 issued on Jun. 27, 1989 to Eugene F. LaCroix, titled "Multi-Purpose Baton," describes a device somewhat resembling the flashlight and baton apparatus of the Mains '171 U.S. Patent, with its laterally disposed hand grip. However, LaCroix also provides a series of longitudinally disposed electrical conductors along the length of the device, similarly to the configuration of the device of the Jordan '108 U.S. Patent discussed further above. LaCroix also provides a light, but it is only intended to temporarily blind a potential assailant, rather than to provide any useful illumination for the user of the device. The lateral extension of the LaCroix device does not facilitate its use as an impact weapon, as provided by the generally cylindrical configuration of the present device.

U.S. Pat. No. 5,467,247 issued on Nov. 14, 1995 to Richard N. de Anda et al., titled "Electronic Stunning Apparatus," describes a device having concealed electrical contacts which are not exposed until the device is pressed against another body. The de Anda et al. device is relatively small, being about the size of a flashlight. It is thus not suitable for use as an impact weapon, as provided by the present invention. The de Anda et al. device more closely resembles the relatively small device disclosed in the '695 U.S. Patent to Henderson et al., than it does the present a personal defense device. Moreover, de Anda et al. do not disclose any form of lighting with their device, and the concealed electrical contacts cannot provide a visible display of electrical discharge to dissuade a potential attacker.

U.S. Pat. No. 5,654,867 issued on Aug. 5, 1997 to John H. Murray, titled "Immobilization Weapon," describes a hand held device with a pair of elongated flexible electrodes and a set of electrodes which can be ballistically fired at another person in order to deliver an electrical shock remotely. The Murray device has a square section, pistol grip configuration with a relatively short upper portion for firing the ballistically delivered electrodes. The two elongated electrodes extending from the device, extend from the top of the device above the pistol grip portion. The physical configuration of the Murray device does not enable it to be used as an impact weapon, e.g., night stick, etc., as can the present personal defense device.

U.S. Pat. No. 5,962,806 issued on Oct. 5, 1999 to Peter G. Coakley et al., titled "Non-Lethal Projectile For Delivering An Electric Shock To A Living Target," describes a series of embodiments for ballistically launching an independent device capable of delivering an electric shock to a living target. The shocking device of the Coakley et al. apparatus is not connected to the firing weapon in any way, as by wires, etc. as used in some projectile firing devices of the prior art. Thus, the electrical device cannot be controlled once it leaves the weapon. Also, while Coakley et al. disclose baton and flashlight embodiments of their projectile and delivery device, they do not provide a device having all of the features of the present invention, e.g., ribs for greater impact, low blades which may be attached to the ribs for imparting minor cuts, or radially disposed lighting means.

U.S. Pat. No. 5,986,872 issued on Nov. 16, 1999 to Eugene M. Chaput, titled "Multi-Component Electric Stunning Umbrella," describes a device having electrical storage cell and electronic component means in the handle, with electrical wiring extending up the relatively narrow shaft thereof to a distal tip having a pair of stunning electrodes therein. A more or less conventional umbrella is extendible from the tip, permitting the device to be used as an umbrella as desired. A hard plastic cover may be installed over the folded umbrella, as desired. Chaput states that this hard plastic cover permits the device to be used as a baton or impact weapon, but this would require that the plastic sleeve be installed over the folded umbrella whenever the potential need of an impact weapon was foreseen. Moreover, while Chaput provides additional electrodes along the sides of the impact sleeve, he does not provide any additional ribs or blades to increase the effectiveness of the device as an impact weapon, as provided by the present personal defense device.

U.S. Pat. No. 6,022,120 issued on Feb. 8, 2000 to Hung-Yi Chang, titled "Lighting Device For A Stun Gun," describes a separate flashlight type device with the light beam oriented axially relative to the remainder of the device, rather than radially, as in the lighting means of the present device. The Chang assembly cannot be used as an impact weapon, as it is relatively short and compact, with the operating switches located, at the approximate midpoints along the opposite sides thereof.

U.S. Pat. No. 6,091,597 issued on Jul. 18, 2000 to Ming-Chen Lin, titled "Structure Of An Electric Shock Device," describes a device having a series of selectively extendible telescoping sections. The sections each have electrodes extending along their opposite sides, but no tip electrodes are provided. Also, while the Lin device includes a flashlight, the light is oriented parallel to the length of the device, rather than being radially disposed to the length of the device. Moreover, the hollow telescoping tubes of the Lin device do not appear to provide sufficient strength for use as an impact weapon (baton, etc.), and Lin makes no disclosure or claim of such function for his device.

U.S. Pat. No. 6,256,916 issued on Jul. 10, 2001 to Thomas V. McNulty, titled "Stun Gun," describes a device having a short, pistol grip configuration with a trapezoidal head extending therefrom. The two electrical contacts are on adjacent faces of the trapezoid, angularly separated from one another. McNulty states that this causes the trapezoidal shape to compress the muscle tissue of the subject before both contacts are in contact with the skin, thus providing a greater electric shock effect and muscle contraction. The McNulty device more closely resembles the device of the '867 U.S. Patent to Murray, discussed further above, than it does the present invention. McNulty also provides a ballistically fired device having electrical stunning contacts with his device. However, The relatively short length of the McNulty stun device is not suitable for use as an impact weapon or baton, and no lighting means is provided by McNulty for his device.

U.S. Pat. No. D-255,139 issued on May 27, 1980 to James A. Smith, titled "Electric Baton For Law Enforcement Personnel," illustrates a design comprising a relatively short, generally cylindrical device. An electrical switch is apparently provided at about the midpoint of the device, which further precludes its use as an impact weapon or baton. No additional impact ribs, blades, or lighting means are apparent in the Smith design.

U.S. Pat. No. D-273,216 issued on Mar. 27, 1984 to Harold S. Sinrod, titled "Multi-Purpose Defense Baton," illustrates various embodiments of a design comprising a relatively narrow, elongated cylindrical shape with a hand guard between a handle portion and longer distal portion. No electrical function of any sort is apparent in the Sinrod design.

U.S. Pat. No. D-289,313 issued on Apr. 14, 1987 to More Shy, titled "Hand-Held Electric Prod," illustrates a design having a generally cylindrical shape with a hand guard adjacent one end. No disclosure is made of any function as an impact weapon, nor is any lighting means shown for the design. The Shy design more closely resembles the design of the '216 U.S. Design Patent to Sinrod, discussed above, than it does the present invention.

U.S. Pat. No. D-329,510 issued on Sep. 15, 1992 to Hsiung Lin, tiled "Hand-Held Electric Prod," illustrates a design comprising a relatively short, generally cylindrical device having a hand guard between a handle portion and distal portion. The Lin device thus more closely resembles the device of the de Anda et al. '247 U.S. Patent, discussed further above, than it does the present personal defense device. While no statement of such is made in the Lin Design Patent, it appears that the electrodes are disposed along the opposite sides of the distal end portion of the device, rather than from the end, as in the present device.

U.S. Pat. No. D-351,640 issued on Oct. 18, 1994 to Richard N. de Anda et al., titled "Electronic Stunning Weapon," illustrates a design apparently identical to the device of the '247 U.S. Utility Patent issued to the same inventors and filed on even date, discussed further above. The same points of difference: raised in the discussion of the de Anda et al. '247 U.S. Utility Patent, are seen to apply here as well.

Finally, British Patent Publication No. 2,196,728 published on May 5, 1988 to Chun Chang Kuo, titled "Flash Light," describes an apparatus which is actually a combination of several devices. The Kuo apparatus includes an axial flashlight, as well as selectively extendible electrical probes for the device to serve as a stun weapon if so desired. Moreover, the Kuo apparatus includes an audible warning system, e.g., a buzzer or siren, and the flashlight may be used as a visual warning device as well. However, Kuo makes no statement or claim that his apparatus is suitable for use as an impact weapon (baton, etc.). The light is disposed in the distal end of the device, and it is questionable whether the light; as well as other componentry, would stand up to the forces resulting from use of the device as an impact weapon.

None of the above inventions and patents, taken either singularly or in combination, is seen to describe the instant invention as claimed. Thus a personal defense device solving the aforementioned problems is desired.

SUMMARY OF THE INVENTION

A hand held personal defense device includes a number off different features to provide a versatile defense weapon for law enforcement and other personnel who have need of such a device. The present device comprises an elongate, generally cylindrical tube including electrical contacts extending from one end thereof and conventional electrical circuitry therein for stepping up electrical cell voltage to a high level for use as a stunning weapon and deterrent.

The structure of the device is formed of a high strength synthetic composite material for optimum durability, and includes a series of ribs along the exterior surface for greater effect as an impact weapon. One or more blades may be attached to the ribs in order to produce shallow cuts upon the body of a person when struck by the present device. The present device also includes a small but powerful light source emitting its light radially from the body of the device, for effectiveness when the device is raised for use as an impact weapon. The electrical circuitry of the present device is adapted to provide great durability and resistance to damage under high impact forces, as will likely occur from time to time with the use of the device.

Accordingly, it is a principal object of the invention to provide a personal defense device providing multiple functions of an electrical stun weapon, impact weapon or baton, and light source in a single device.

It is another object of the invention to provide such a, defense device comprising a durable, high strength tubular shell having a series of ribs extending therefrom to provide greater damage when the device is used as an impact weapon, and which may include a series of blades removably secured to the ribs to produce shallow cuts due to impact from the device.

It is a further object of the invention to provide redundant flexible electrical circuitry within the device, for greater durability and resistance to damage due to forces developed when the device is used as an impact weapon.

Still another object of the invention is to provide an. interrupter switch for the high voltage electrical stunning circuit, which interrupter switch is normally closed to require the user of the device to hold the switch in order to disable the electrical stunning circuitry.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a personal defense device, combining features of an electrical stun weapon or device with an impact weapon (baton, night stick, or the like) and a small, high intensity light. These features have not been combined into a single device, prior to the development of the present invention. In addition, the present defense device incorporates extremely durable, redundant electrical circuitry, in order to provide the desired reliability and durability for the electrical circuitry when employed with an impact weapon.

Figure 1:
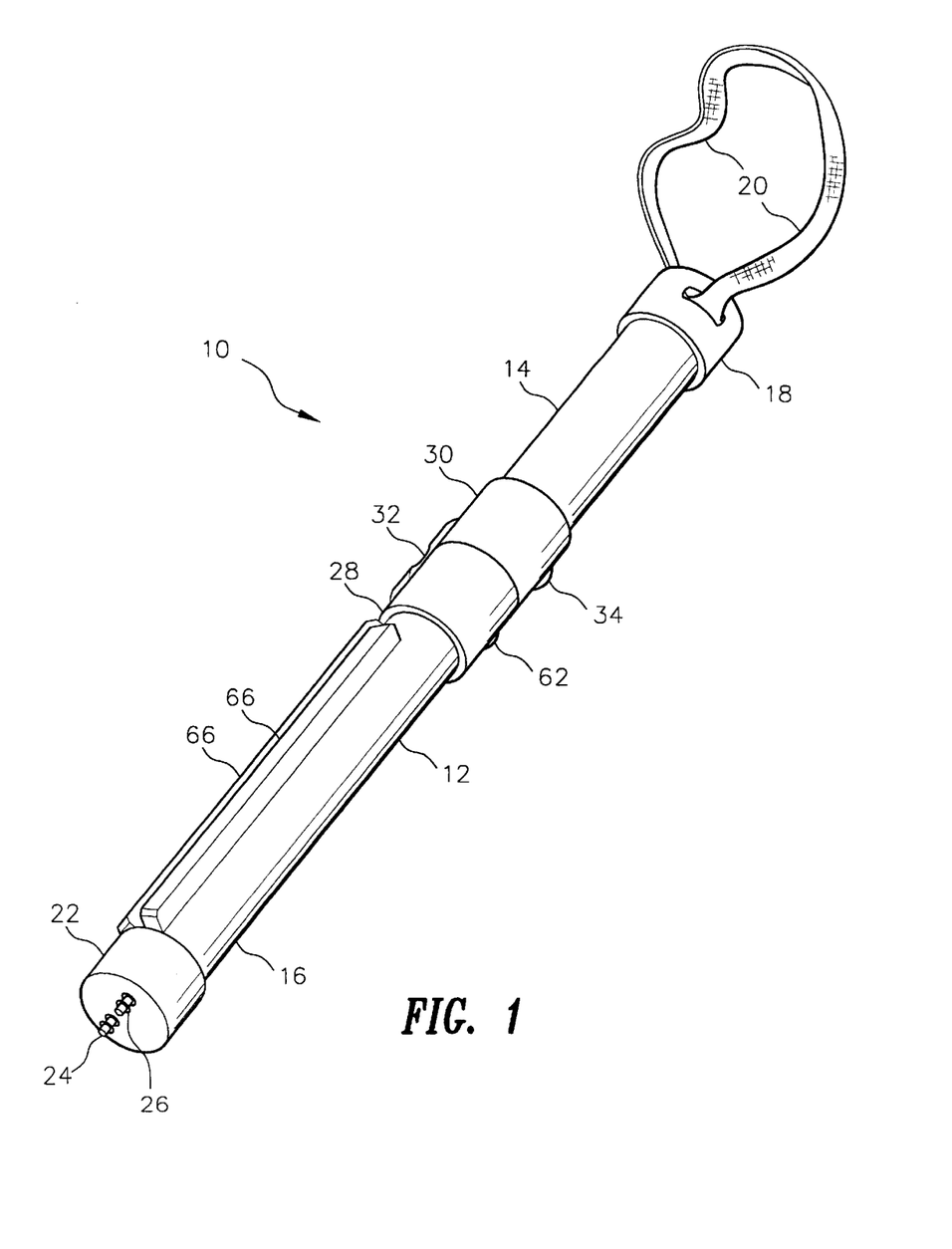
FIG. 1 is a perspective view of a personal defense device according to the present invention.

FIG. 1 of the drawings provides a perspective view of the present personal defense device 10, illustrating its general configuration. The personal defense device 10 generally comprises an elongated, generally cylindrical, hollow tube 12, having a handle end 14 and a distal electrical discharge end 16 opposite the handle end 14. The tube 12 may be formed of a variety of materials, but as the present device 10 is used as an impact weapon as well as an electrically discharging stunning weapon, the material used is preferably a hard, rigid, somewhat dense material, capable of withstanding impact forces when used as a police baton, club, or the like. Due to the high electrical voltages developed by the electrical circuitry of the present invention, the material preferably has a very high dielectric property, at least greater than that of air, in order to preclude electrical arcing across or through the material. A composite material formed by a thermosetting resin in a synthetic fiber matrix, e.g., Ultra*comp® UC-200, made by Tri-Star Plastics Corp. of Shrewsbury, Mass. has been found to meet these requirements. However, other suitable materials may be substituted as desired.

The handle end 14 may be equipped with a removable cap 18 for accessing electrical storage cells (batteries) and/or other internal componentry. A wrist strap 20 or the like may be secured to the device 10 by the handle end cap 18, if so desired. The opposite electrical discharge or output end 16 may be equipped with a similar cap 22, with the electrical stunning electrodes 24 and 26 extending therefrom. Preferably, the caps 18 and 22 are provided with seals or other suitable means to provide a waterproof fit.

Two concentric sleeves 28 and 30 may be installed about the tube 12 in the approximate medial area thereof, or more precisely, somewhat closer to the handle portion 14 of the assembly. These sleeves 28 and 30 secure the switches controlling the high voltage circuitry for the present invention, as shown pictorially in FIG. 2 and schematically in FIG. 4 of the drawings. A master switch 32 is provided to turn the high voltage stun circuitry on and off, with a second, momentary contact switch 34 being provided to enable and disable the electrical stun circuitry as desired.

Figure 2:
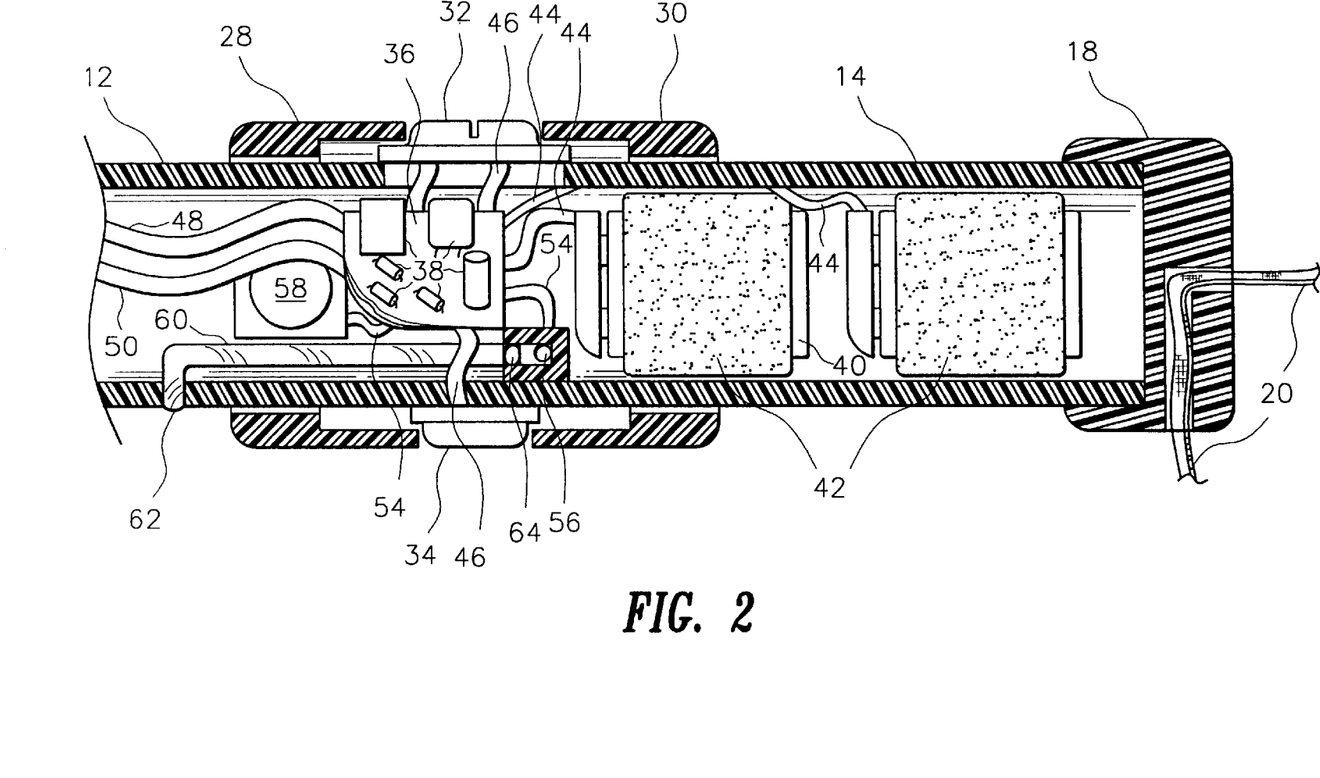
FIG. 2 is a fragmented longitudinal section view of the rearward or handle portion of the present personal defense device, showing the flex circuitry and various internal details thereof.
Figure 4:
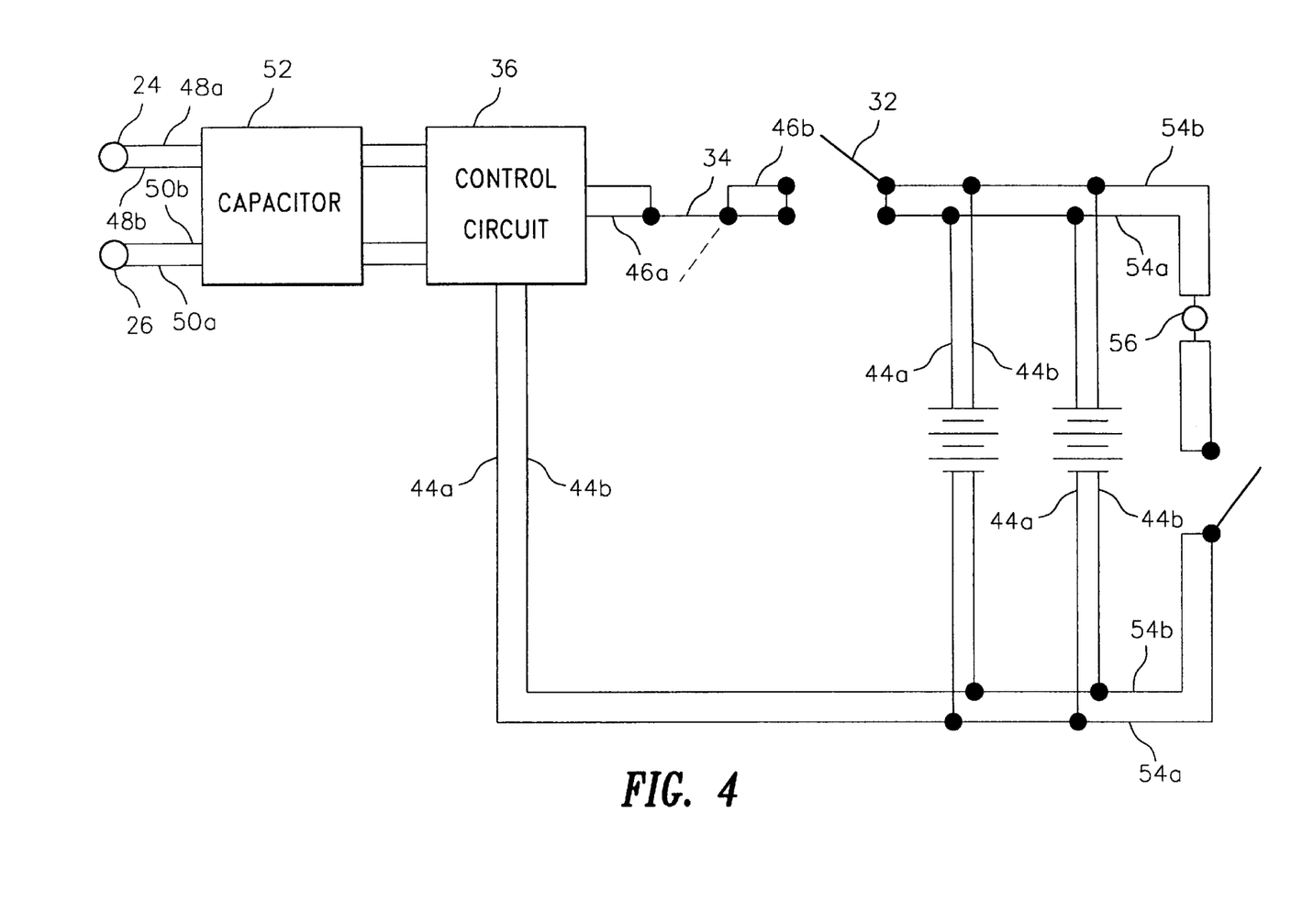
FIG. 4 is a schematic diagram illustrating the dual path electrical circuitry provided for reliability in the present personal defense device.

The master switch 32 is preferably a rocker type switch, with opposite ends of the switch either actuating or deactivating the high voltage circuit alternately as they are pushed. The secondary switch 34 is preferably normally on or closed, and is wired in series with the master switch 32 and/or high voltage circuit. The operator of the present personal defense device 10 normally actuates the electrical circuitry by turning the master switch 32 on when it appears that the need for electrical stun capability may be needed. The operator then holds the secondary switch 34 to keep it open, thus keeping the high.voltage circuitry in a deactivated condition. However, when the operator releases the secondary switch 34, the high voltage system is activated. The operator thus need not continually hold a switch in order to keep the high voltage circuitry activated. These switches 32 and 34 are secured within passages through the tube 12 wall by the sleeves 28 and 30, and are preferably encased in rubber or the like to provide a waterproof assembly and preclude electrical arcing from the switches.

FIG. 2 provides a pictorial view of the voltage step-up and other circuitry within the tube 12 of the device 10, while FIG. 4 provides a schematic view of the circuitry. The electrical circuitry used with the present invention is flexible (or "flex") circuitry, insofar as possible. Flex circuitry, rather than using conventional insulated wires, utilizes thin, flexible plastic sheet material with conductive material imprinted or otherwise formed thereon, in a similar manner to that used in the formation of conventional printed circuit boards and the like. However, rather than using rigid board-like material, the circuitry of the present invention utilizes a thin, flexible plastic central board or sheet 36 (shown with its lower left corner flexed upwardly, in FIG. 2) which contains most of the various electronic components 38 which operate the high voltage system of the present invention. A series of flex circuit lines, described specifically further below and in FIG. 4, extend from the "mother board" 36 to the various electronic components of the present invention. Such flex circuitry is conventional, and is used in the aviation and automotive industries, to provide good reliability and durability in harsh environments where electronics are exposed to vibration and other forces.

The voltage step-up and lighting systems of the present invention are powered by a pair of nine volt electrical cells (batteries) 40, wired in parallel, as shown in FIG. 4. The cells or batteries 40 are preferably wrapped in an insulating sleeve 42 of Neoprene or other material, in order to keep them warmer and provide more efficient operation in colder temperatures.

The various electrical connectors extending between components are preferably formed of thin, flat flex circuitry, as noted further above. In addition, all of the wiring or circuitry is redundant, with each connector element carrying two electrical paths, designated as paths a and b, in FIG. 4 of the drawings. For example, the lines 44 between the batteries 40 and the main control circuit are indicated as circuits 44a and 44b in FIG. 4. The lines 46 extending from the control circuit board or sheet 36 to the master and secondary switches 32 and 34 are designated as separate, parallel circuits 46a and 46b in FIG. 4. (It will be noted that the pictorial view of FIG. 2 illustrates these lines 46 as returning separately to the control sheet 36, while they are wired in series between the batteries 40 and the control board or sheet 36. A number of different circuit routings are possible, but the principle remains the same.) The electrical conductors 48 and 50 extending between the control board 36 and the respective electrodes 24 and 26 (with a capacitor 52 illustrated in the circuit therewith in FIG. 4), are indicated as conductors 48a, 48b, 50a, and 50b in FIG. 4. Finally, the lighting circuit 54 is indicated by conductor paths 54a and 54b in FIG. 4. The provision of parallel, dual circuit paths for the electrical circuitry of the present invention provides a significant improvement in reliability and durability over conventional single wire circuit runs used in other electrical stun devices of the prior art, and enables the present invention to be used as an impact weapon without damage to the electrical and electronic elements thereof.

A number of different electrical or electronic circuits may be used to provide the voltage step-up required to provide the desired high voltage to the two electrodes 24 and 26 from the two nine volt batteries 40. Older technology may make use of vibrator points to develop the alternating (actually pulsating dc) current required to drive the transformers to step up the voltage to the level desired. The present invention may make use of such mechanical point systems, but preferably utilizes conventional solid state oscillator circuitry to produce the variable voltage required to drive a step-up transformer to arrive at the proper voltage. Any such systems are conventional, and may be incorporated herein.

In addition to the above circuitry for providing the required high voltage to the electrodes 24 and 26, the present personal defense device 10 may also include a light source (e.g., small flashlight or signal light, etc.) if so desired. FIGS. 2 and 4 also illustrate such a lighting system incorporated with the present invention. A small, bright light source 56 is located in a housing within the tube 12, and is controlled by a switch 58. The switch 58 may be a single pole type, as shown schematically in FIG. 4 of the drawings. However, all of the switches 32, 34, and 58 may also be conventional double pole types for greater redundancy and reliability, if so desired. A fiberoptic (acrylic) rod or bundle 60 extends from the light source 56 to an output 62 which projects radially from the tube 12. Different lenses 64 (e.g., infrared, ultraviolet, etc.) may be installed between the light source 56 and fiberoptic line 60, as desired.

Figure 3:
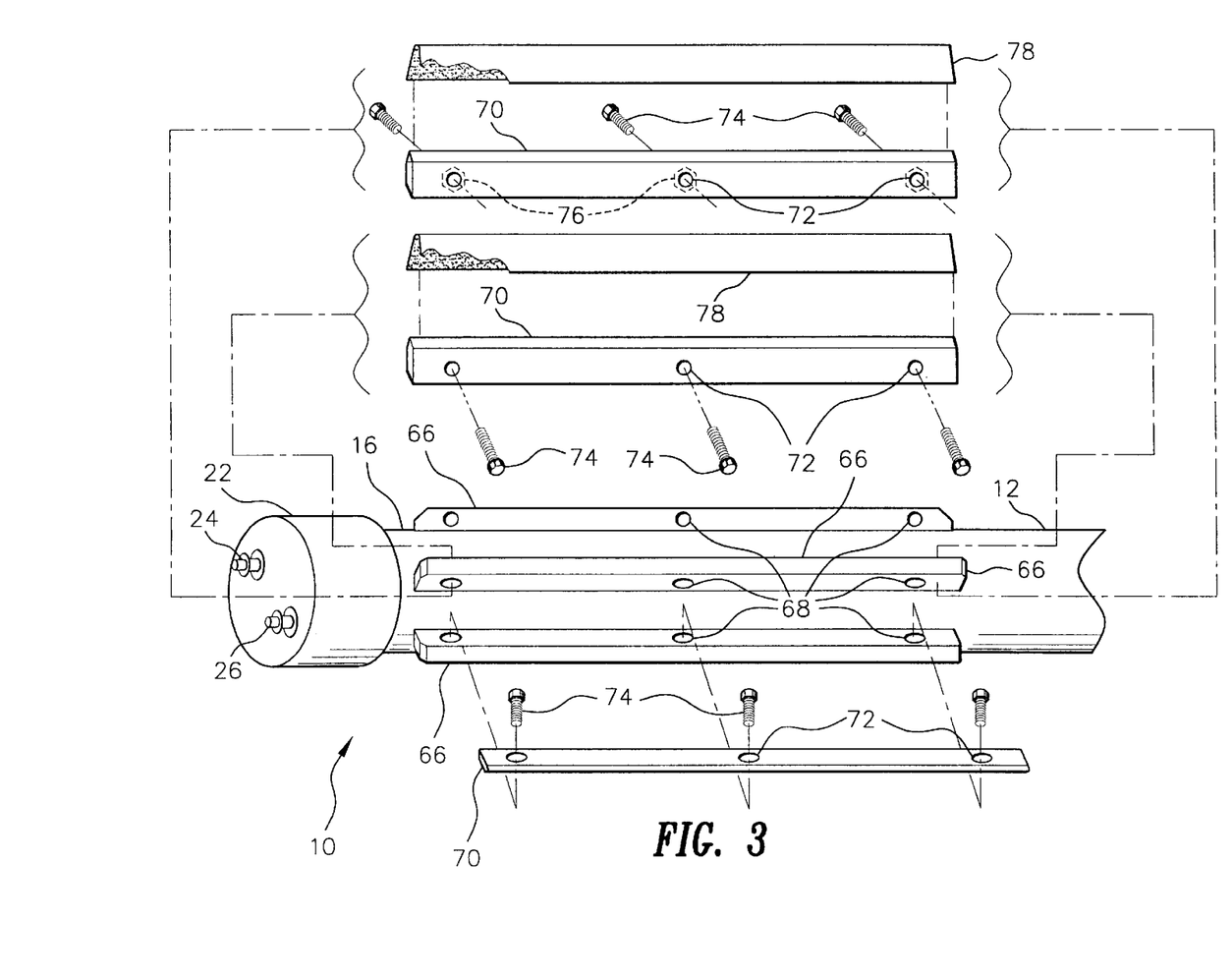
FIG. 3 is an exploded perspective view of the forward portion of the present personal defense device, showing the impact ribs and removable attachment of blades and blade guards thereto.

The present personal defense device 10 is a multi-purpose tool, and is useful as an impact weapon (baton, club, etc.) as well[0a‰1]s an electrical stunning device and light, as noted further above. FIGS. 1 and 3 (particularly FIG. 3) illustrate the external configuration of the present device 10 for use as an impact weapon. At least one (and preferably a series of) hard, rigid, elongate impact rib(s)s 66 project(s) radially from the exterior of the tube 12 and extend(s) therealong, from a point near the electrode or electrical discharge end cap 22, back toward the handle portion 14 of the tube 12, stopping short of the two switch securing sleeves 28 and 30. The ribs 66 are preferably formed of the same material, e.g., Ultra*comp UC-200, as the remainder of the exterior of the device 10, but other materials may be substituted as desired, so long as they are electrically non-conductive and provide the other desired properties of hardness, strength, durability, etc. The ribs 66 may be disposed along only one side of the impact end 16 of the tube 12, in order to allow the operator to use the opposite smooth, non-ribbed side or surface if less force is required.

FIG. 3 illustrates a further embodiment of the invention, in which the ribs 66 are provided with a series of mounting holes 68 for the removable attachment of a shallow, radially disposed cutting blade 70 to each rib 66. The blades 70 are equipped with, a like series of attachment holes 72, through which a series of bolts 74 or the like may be installed. The bolts may be retained by threading the rib holes 68, inserts within the rib holes 68, conventional nuts 76 on the opposite sides of the blades, etc.

The blades 70 are preferably formed of corrosion resistant steel, for toughness, durability, and ease of maintenance. Other materials may be used as desired. Each blade 70 has a relatively shallow, widely angled, but sharp, cutting edge therealong. The object of the blades 70 is not to inflict serious arterial bleeding through a deep cut, but rather to break the skin of an assailant to produce some bleeding as a secondary effect while primarily, inflicting a certain amount of pain, in order to distract and slow an assailant. Blade guards 78 formed of heat shrink tape or other suitable material, may be applied to the blades 70 in order to protect persons handling the present device 10. Such relatively thin plastic tape 78 may be left in place at all times, including during use of the present device 10, as the tape is easily cut through by the blades 70 upon impact.

In conclusion, the present personal defense device provides a significant advance in personal defense technology for law enforcement officers and others who have need to confront aggressive persons with physical force. The present device combines features of an electrical stun device, an impact device (baton, etc.), an edged weapon by means of its optional shallow blades, and a light source for illumination or signalling, in a single device. This greatly simplifies the carriage of equipment by law enforcement personnel, eliminating the need for a separate electrical stunning device along with a flashlight and baton.

Having a single, versatile tool or piece of equipment to handle all of the above functions, greatly facilitates the reactions of the officer in a hazardous situation, as he or she need not make a decision as to which tool or equipment to access, and then reach for that specific item of equipment. The present defense device provides all the equipment a law enforcement officer is likely to require, except a firearm, in a single device.

The use of dual, redundant, flex electrical circuitry in the present device provides a significant improvement in reliability for such devices, and enables the present defense device to be utilized as an impact or edged weapon where it is subject to considerable shock forces, without risk of damage to internal components. Preferably, mechanical connectors are used to secure electrical components to one another, in order to avoid potential problems with solder joints and the like becoming brittle and separating due to flexing. The present personal defense device thus provides all of the deterrent means which would normally be desired by a law enforcement officer in hand to hand situations in a single device, which will find great favor among law enforcement officers and others who have need of such versatility in a single device.

It is to be understood that the present invention is not limited to the embodiment described above, but encompasses any and all embodiments within the scope of the following claims.

I claim:

1. A personal defense device, comprising:
    an elongated, electrically non-conducting, hard, rigid, generally cylindrical, hollow tube having a handle end and an electrical discharge end opposite said handle end;
    first and second electrodes extending from said electrical discharge end of said tube;
    electrical circuitry disposed within said tube, for increasing voltage to a high level for selectively producing an electrical discharge of stunning intensity from said electrodes; and
    at least one electrically non-conducting, rigid, elongate impact rib projecting from said tube and extending from a point adjacent said electrical discharge end of said tube toward said handle end of said tube.

2. The personal defense device according to claim 1, further including a shallow metal blade removably attached to said at least one impact rib and projecting radially therefrom.

3. The personal defense device according to claim 1, further including lighting means disposed in said tube for providing illumination, said lighting means further having means for projecting light radially from said tube.

4. The personal defense device according to claim 1, wherein said electrical circuitry comprises flex circuitry.

5. The personal defense device according to claim 1, wherein said electrical circuitry comprises redundant dual circuits.

6. The personal defense device according to claim 1, further including:
    a master switch controlling said electrical circuitry for selectively producing the electrical discharge; and
    a normally closed, momentary contact switch disposed in series with said electrical circuitry, whereby release of said momentary contact switch activates said electrical circuitry for selectively producing the electrical discharge, when said master switch is on.

7. The personal defense device according to claim 1, wherein said tube is formed of a synthetic composite material.

8. A personal defense device, comprising:
    an elongated, electrically non-conducting, hard, rigid, generally cylindrical, hollow tube having a handle end and an electrical discharge end opposite said handle end;
    first and second electrodes extending from said electrical discharge end of said tube; and
    redundant, dual flex electrical circuitry disposed within said tube, for increasing voltage to a high level for selectively producing an electrical discharge of stunning intensity from said electrodes.

9. The personal defense device according to claim 8, further, including at least one electrically non-conducting, rigid, elongate impact rib projecting from said tube and extending from a point adjacent said electrical discharge end of said tube toward said handle end of said tube.

10. The personal defense device according to claim 9, further including a shallow metal blade removably attached to said at least one impact rib and projecting radially therefrom.

11. The personal defense device according to claim 8, further including lighting means disposed in said tube for providing illumination, said lighting means further having means for projecting light radially from said tube.

12. The personal defense device according to claim 8, further including:
   a master switch controlling said electrical circuitry for selectively producing the electrical discharge; and
   a normally closed, momentary contact switch disposed in series with said electrical circuitry, whereby release of said momentary contact switch activates said electrical circuitry for selectively producing the electrical discharge, when said master switch is on.

13. The personal defense device according to claim 8, wherein said tube is formed of a synthetic composite material.

14. A personal defense device, comprising:
   an elongated, electrically non-conducting, hard, rigid, generally cylindrical, hollow tube having a handle end and an electrical discharge end opposite said handle end;
   first and second electrodes extending from said electrical discharge end of said tube;
   electrical circuitry disposed within said tube, for increasing voltage to a high level for selectively producing an electrical discharge of stunning intensity from said electrodes;
   a master switch controlling said electrical circuitry selectively producing the electrical discharge; and
   a normally closed, momentary contact switch disposed in series with said electrical circuitry, whereby release of said momentary contact switch activates said electrical circuitry for selectively producing the electrical discharge, when said master switch is on.

15. The personal defense device according to claim 14, further including at least one electrically non-conducting, rigid, elongate impact rib projecting from said tube and extending from a point adjacent said electrical discharge end of said tube toward said handle end of said tube.

16. The personal defense device according to claim 15, further including a shallow metal blade removably attached to said at least one impact rib and projecting radially therefrom.

17. The personal defense device according to claim 14, further including lighting means disposed in said tube for providing illumination, said lighting means further having means for projecting light radially from said tube.

18. The personal defense device according to claim 14, wherein said electrical circuitry comprises flex circuitry.

19. The personal defense device according to claim 14, wherein said electrical circuitry comprises redundant dual circuits.

20. The personal defense device according to claim 14, wherein said tube is formed of a synthetic composite material.

* * * * *